United States Patent

Hanks

[11] Patent Number: 6,066,835
[45] Date of Patent: May 23, 2000

[54] WELDING LEAD ASSEMBLY

[75] Inventor: Rickey R. Hanks, Lakeland, Fla.

[73] Assignee: S M C I, Inc., Lakeland, Fla.

[21] Appl. No.: 09/148,216

[22] Filed: Sep. 4, 1998

[51] Int. Cl.[7] ........................................... B23K 9/00
[52] U.S. Cl. ........................... 219/137.9; 219/137.31; 219/137.51; 219/137.52; 219/137.63
[58] Field of Search ........................... 219/137.9, 137.31, 219/137.51, 137.52, 137.63

[56] References Cited

U.S. PATENT DOCUMENTS

| | | | |
|---|---|---|---|
| 3,992,565 | 11/1976 | Gatfield | 174/15 WF |
| 4,210,796 | 7/1980 | Moerke | 219/137.63 |
| 4,600,824 | 7/1986 | Moerke | 219/137.63 |
| 5,874,709 | 2/1999 | New et al. | 219/137.9 |

*Primary Examiner*—Patrick Ryan
*Assistant Examiner*—M. Alexandar Elve
*Attorney, Agent, or Firm*—A. W. Fisher, III

[57] ABSTRACT

A welding lead assembly for use with a metal inert gas welding system to operatively couple a welding gun through an electrode feed unit of the metal inert gas welder to a power supply and an inert gas supply, the welding lead assembly includes a unitary welding lead having an inner flexible inert gas conduit coaxially disposed within a flexible electrical conductor and a plurality of electrode feed control elements to selectively supply inert gas and electrical power to the electrode feed unit through the inner flexible inert gas conduit and the flexible electrical conductor respectively and control signals between the welding gun and the power supply and inert gas supply through the electrode feed control elements to control operation of the metal inert gas welding system.

18 Claims, 5 Drawing Sheets

WELDING LEAD ASSEMBLY

BACKGROUND OF THE INVENTION

1. Field of the Invention

A unitary wire welding lead assembly for use with a metal inert gas welding system.

2. Description of the Prior Art

Numerous metal inert gas (MIG) welding systems have been developed. MIG welding systems generally comprise four main components including an inert gas supply, a power supply, an electrode feed unit and a welding gun. The power supply converts high voltage alternating electrical current into low voltage direct current for the purpose of energizing the electrode wire and a low voltage direct current for operation of the electrode feed unit. The electrode feed unit includes a spool of malleable electrode wire which can be continuously fed through a hollow welding lead together with inert gas to the welding gun. The advancement of the electrode wire is controlled by a trigger switch on the welding gun connected to the power supply by control wiring through via the electrode feed unit.

While many refinements have been made in MIG welding systems, the present methods of connecting the electrode feed unit to the power supply and the inert gas supply continues to present several limitations. Electrode feed units are typically designed to be portable such that the units can easily be located adjacent to the structure to be welded. Conversely, the power supply and inert gas supply are typically less portable in terms of their weight, size and configuration. As a result, in most applications it is desirable to place the power supply and inert gas supply in a central location within the work area. The electrode feed unit is then moved through the work area as needed. Unfortunately, the combined bulk of the various wiring and gas conduits required often results in a cluttered work area and makes a cumbersome process of moving the electrode feed unit.

In practice, many users attempt to bundle or secure the various electrical wiring and inert gas conduit together with electrical tape. While this practice does lessen the space occupied by the leads, the practice must be repeated frequently as the tape fails under normal use. By combining the electrical wiring and inert gas conduit within a single elastomeric covering, the present invention eliminates the need for taping. Further, the concentric configuration of the components of the present invention, the wiring assembly is much more compact and flexible than taped bundles of wiring and inert gas conduits. As a result, the movement of electrode feed units is less cumbersome and can be moved throughout a larger portion of the work space without moving the power supply or inert gas supply.

Several MIG welding systems have been developed Which combine wiring and inert gas conduits in a unitary assembly. However, such assemblies have typically been applied to the connection between the welding gun and the electrode feed unit. Further, such systems do not include the improvements of the present invention including the flexible electrical in concentric combination with the inert gas conduit.

U.S. Pat. No. 3,992,565 describes a welding cable comprising a welding current conductor, switch wires and a gas conductor tube disposed with a single cable jacket. Passages containing the gas conductor tube and the switch wires are accessible through longitudinal openings in the jacket to facilitate insertion and removal of the switch wires and the gas conductor tube.

U.S. Pat. No. 3,703,622 shows a gas-shielded arc torch with a flexible shank between the head and the handle constructed to employ the inflowing gas to cool the electrode and head, to maintain high capacity in the torch while permitting its production in reduced scale.

U.S. Pat. No. 3,309,497 teaches a portable welding unit to continually feed welding wire comprising an enclosure providing a support structure and being adapted for suspending from a welder's body; a container for welding wire to be supplied to the device, and flexible means connected at one end with the support for guidingly carrying welding wire the welding device, whereby the welder is free to move from one welding position to another without being limited by the length of said flexible means.

DE 30 10 451 A 1 describes a cable supplying electricity during, e.g. MIG arc welding. The novelty is that the conductor wires are not arranged concentrically as in the main patent, but form a circular row providing optimum current distribution and better removal of heat from the cable. The new cable is also easier to connect to standard, commercially-available couplings. An elastic tube is used to carry gas forms the core of the cable; and on the core are two semicircular rows of conductor wires separated from each other by insulating cords, which may contain a conductor employed to carry a subsidiary electric current used for control circuits.

Additional examples of the prior art are shown in U.S. 3,433,883 and JP 6-315,770.

SUMMARY OF THE INVENTION

The present invention relates to a welding lead assembly for use with a metal inert gas (MIG) welding system including a unitary welding lead to operatively couple the electrode feed unit of the MIG welding system to a power supply and an inert gas supply. The unitary welding lead comprises an inner flexible inert gas conduit coaxially disposed within an intermediate flexible electrical conductor of metal mesh constructed of fine copper wire sheathed in an outer flexible insulating covering. In operation, the inner flexible inert gas conduit contributes to the structural integrity of the intermediate flexible electrical conductor. In addition, the inert gas flowing through the inner flexible inert gas conduit functions as a heat sink drawing heat generated by electrical resistance in the intermediate flexible electrical conductor through the sidewall of the inner flexible inert gas conduit. Control wiring comprising a plurality of small gauge insulated wires for the electrode feed unit are included in the unitary wire welding lead either disposed between the intermediate flexible electrical conductor and the outer flexible insulating covering or within the intermediate flexible electrical conductor.

The unitary welding lead terminates at each end in welding lead connectors and a plurality of electrode feed unit control leads. Each welding lead connector comprises an elongated handle comprised of a conductive metallic chassis. A fitting is formed on one end of the handle to receive the inner flexible inert gas conduit and an outer unitary welding lead. The fitting comprises a conical end portion on the handle forming a nipple directly received by the inner flexible inert gas conduit. The intermediate flexible electrical conductor extends beyond the end of the inner flexible inert gas conduit to receive the base of the fitting and is retained in place by a threaded compression sleeve. An integral electrical plug is formed on the end of the handle opposite the welding lead fitting to selectively received by a jack formed in the power supply and electrode feed unit to complete the electrical circuit between the power supply and the electrode feed unit. An inert gas duct is formed in the interior of the handle chassis and operatively extends from the connection with the inner flexible inert gas conduit to a second fitting formed on the side of the handle. The second fitting is received by an inert gas supply conduit formed on the inert gas supply and by an inert gas intake conduit formed on the electrode feed unit. The electrode feed unit control wires extend beyond the ends of the inner flexible inert gas conduit and the intermediate electrical conductor from the power unit and the electrode feed unit. Depending upon the particular application, each lead is terminated by an individual bus formed on the power supply and electrode feed unit or collectively terminated in a unitary plug received by a jack on the power supply and electrode feed unit.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
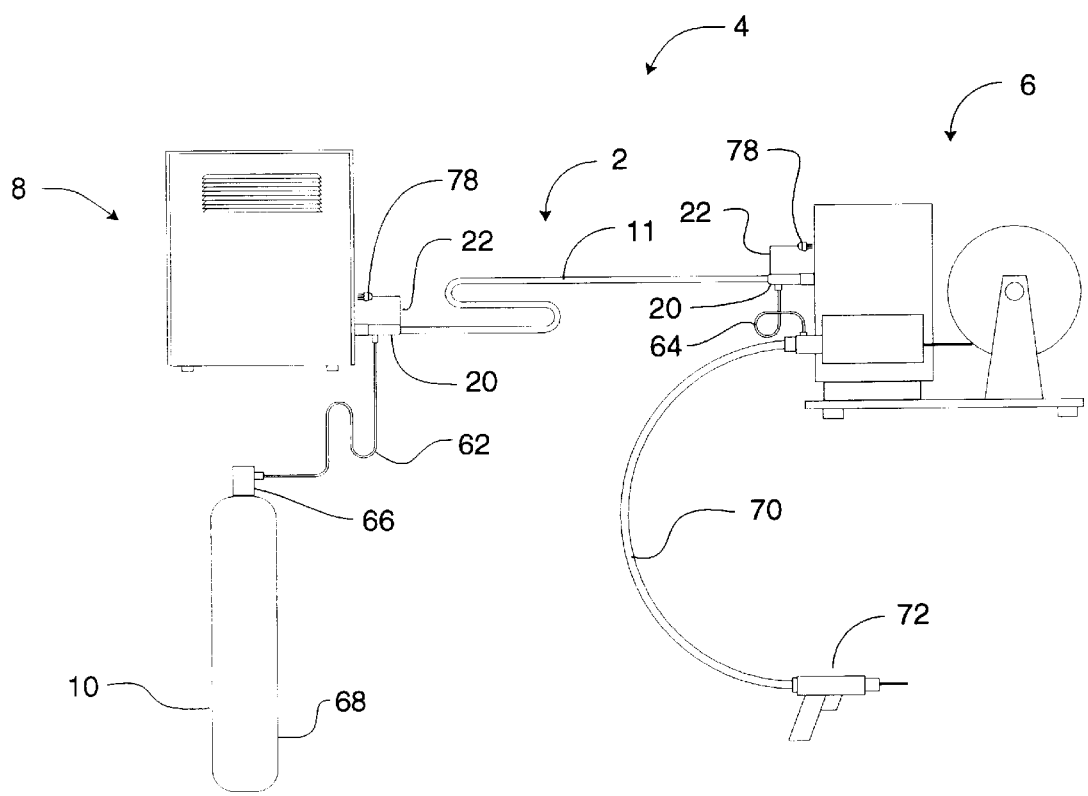
FIG. 1 is a schematic view of the welding lead assembly of the present invention operatively coupled to a metal inert gas welding system.
Figure 2:
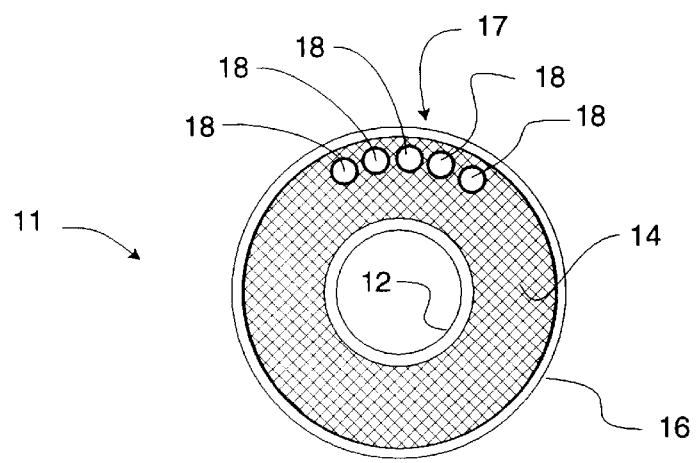
FIG. 2 is a cross-sectional end view of the unitary welding lead of the present invention.

As shown in FIG. 1, the present invention relates to a welding lead assembly generally indicated as 2 for use with a metal inert gas (MIG) welding system generally indicated as 4 for the purpose of connecting an electrode feed unit 6 of the MIG welding system to a power supply 8 and an inert gas supply 10. As shown in FIGS. 1 and 2, the welding lead assembly 2 comprises a unitary welding lead generally indicated as 11 including an inner flexible inert gas conduit 12 coaxially disposed within an intermediate flexible electrical conductor 14 constructed of copper mesh. The intermediate flexible electrical conductor 14 is sheathed in an outer elastomeric covering 16.

Figure 3:
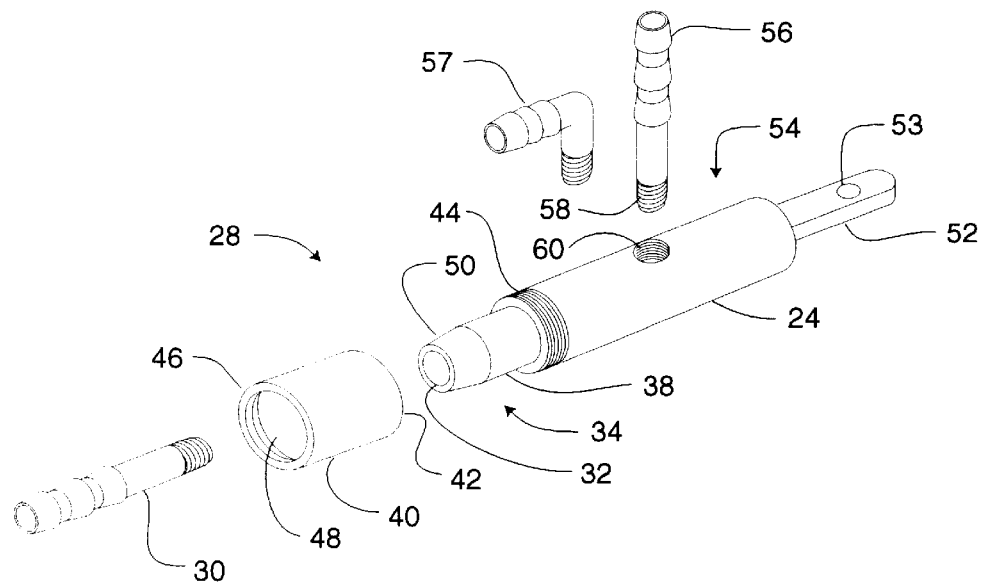
FIG. 3 is an exploded perspective view of the welding lead connector of the present invention.
Figure 4:
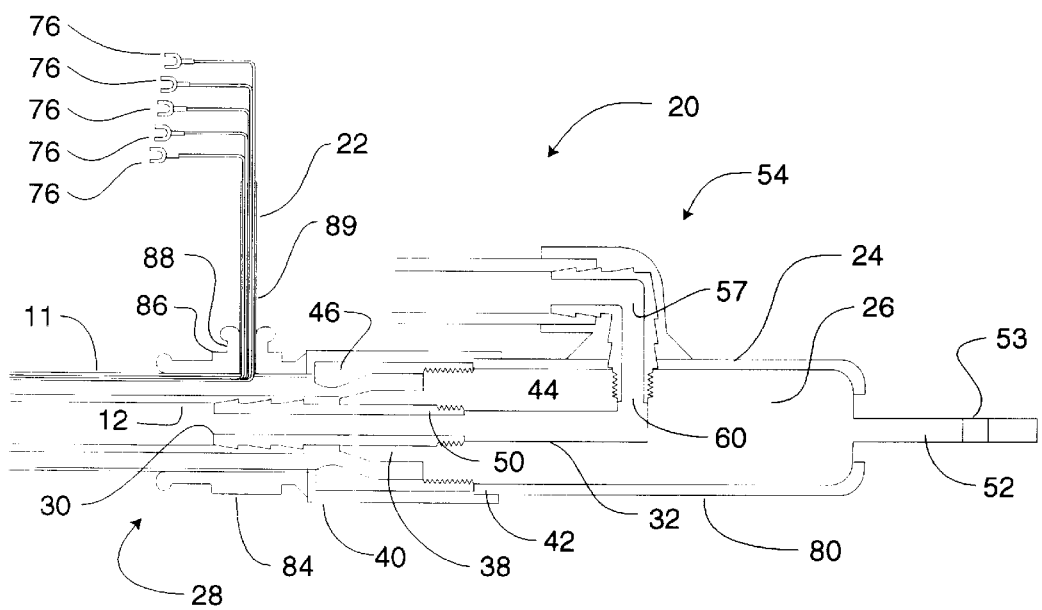
FIG. 4 is a cross-sectional side view of the welding lead connector of the present invention.
Figure 5:
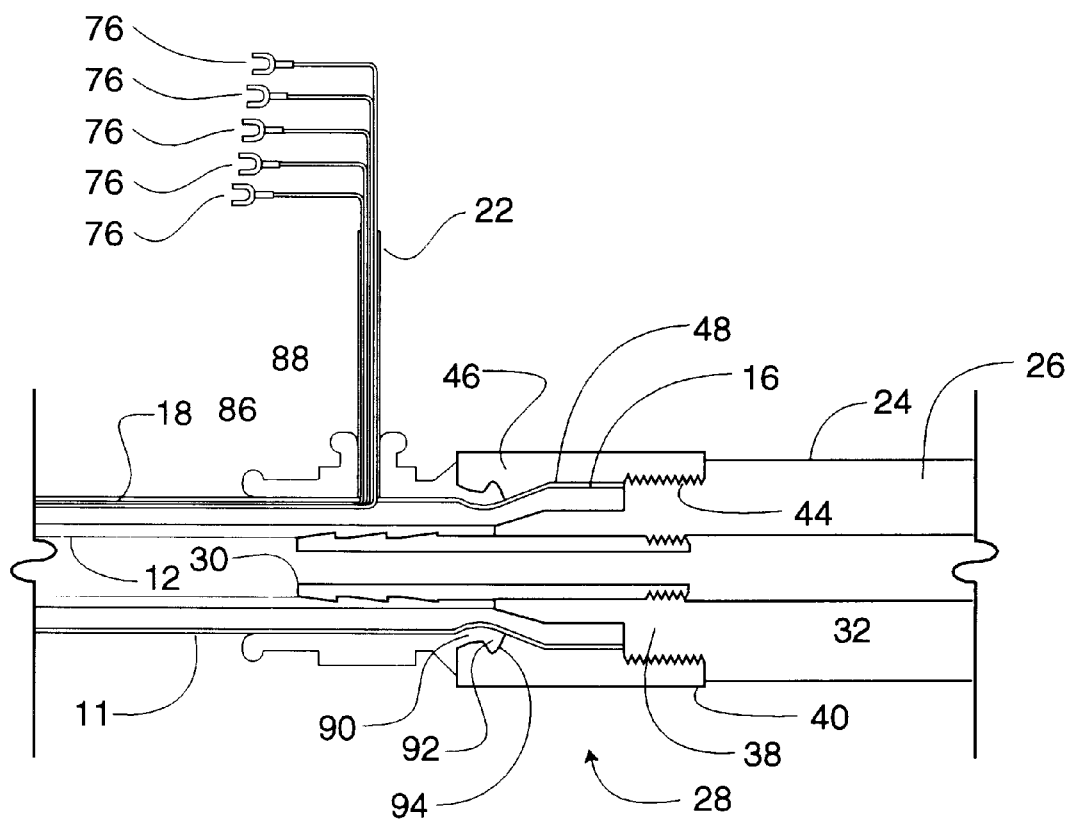
FIG. 5 is a detailed partial cross-sectional side view of the welding lead connector of the present invention.

An electrode feed control generally indicated as 17 comprising a plurality of insulated electrode feed control elements or conductors each indicated as 18 disposed between the intermediate flexible electrical conductor 14 and the outer elastomeric covering 16 as shown in FIGS. 4 and 5. Alternately the electrode feed control 17 may be disposed with the intermediate flexible electrical conductor 14 as shown in FIG. 2. As shown in FIGS. 1 and 3 through 8, the unitary welding lead 11 is terminated at each end by a welding lead connector generally indicated as 20 and by a plurality of electrode feed control leads generally indicated as 22.

As best shown in FIG. 3, each welding lead connector 20 comprises a connector member or handle 24 including an insulated electrically conductive metallic chassis 26. As best shown in FIGS. 3 through 5, a unitary fitting generally indicated as 28 is formed on one end of the connector member or handle 24 including a fitting or a connector nipple 30 received by an inert gas channel 32 formed in the interior of the insulated electrically conductive metallic chassis 26 and extends through a conical end 34 of the connector member or handle 24.

As shown in FIGS. 4 and 5, the opposite end portion of the fitting or connector nipple 30 is operatively coupled to the inner flexible inert gas conduit 12 and the intermediate flexible electrical conductor 14. The intermediate flexible electrical conductor 14 and the outer elastomeric covering 16 extend beyond the end portion 36 of the inner flexible inert gas conduit 12 receiving a base 38 of the conical end 34 of the connector member or handle 24 which are received by a compression sleeve 40. A threaded open end 42 of the compression sleeve 40 receives threads 44 formed on the outer surface of the connector member or handle 24 such that the compression sleeve 40 can be drawn tightly onto the conical end 34 of the handle. As the compression sleeve 40 is drawn onto the conical end 34 of the handle 24, the intermediate flexible electrode 14 and the outer elastomeric covering 16 are crimped between a ridge 46 formed on the inner surface 48 of the compression sleeve 40 and the inclined surface 50 of the conical end 34 of the connector member or handle 24 forming a mechanical and electrically conductive coupling between the unitary welding lead 11 and the welding lead connector 20.

As shown in FIGS. 3, 4 and 6 through 8, an electrically conductive integral plug comprising a substantially flat member 52 including a coupling aperture 53 formed therethrough to receive a fastener member such as a bolt to secure the welding lead connector 20 to the power source 8 and electrode feed unit 6 is formed in the end portion of the handle 24 and is selectively received by an electrical jack (not shown) formed on the electrode feed unit 6 or the power supply 8. A gas fitting means generally indicated as 54 including a fitting or connector nipple 56 is coupled to connector member or handle 24 with the base 58 of the fitting or connector nipple 56 being received by a port 60 formed through the side wall of the connector member or handle 24 in fluid communication with the inert gas channel 32.

The gas fitting means 54 is operatively coupled to an inert gas supply conduit 62 at one end of the unitary welding lead assembly 2 adjacent to the power supply 8 and by an inert gas intake conduit 64 at the end of the unitary welding lead assembly 2 adjacent the electrode feed unit 6. Depending upon the particular application, the fitting or connector nipple 56 may include a 90° elbow 57 (FIGS. 3 and 6).

As shown in FIG. 1, the inert gas supply conduit 62 is connected to a pressure regulator 66 mounted on a supply container 68 to supply inert gas to the MIG system. The inert gas intake conduit 64 is connected to an inert gas intake channel (not shown) on the electrode feed unit 6 such that inert gas exiting the flexible inert gas conduit 12 of the unitary welding lead 2 is transmitted into the welding gun lead 70 and ultimately to a welding gun 72.

As shown in FIGS. 1, 4 and 5, the insulated electrode feed control elements or conductors 18 extend through the outer elastomeric covering 16 adjacent the compression sleeve 40. Opposite outer end portions of the insulated electrode feed control elements or conductors 18 comprise the electrode feed unit control leads 22. Depending on the particular MIG welding system, the electrode feed unit control leads 22 may terminate in individual electrical connectors each indicated as 76 (FIG. 5) or collectively terminated by a unitary electrical plug or socket 78 (FIG. 6).

Figure 6:
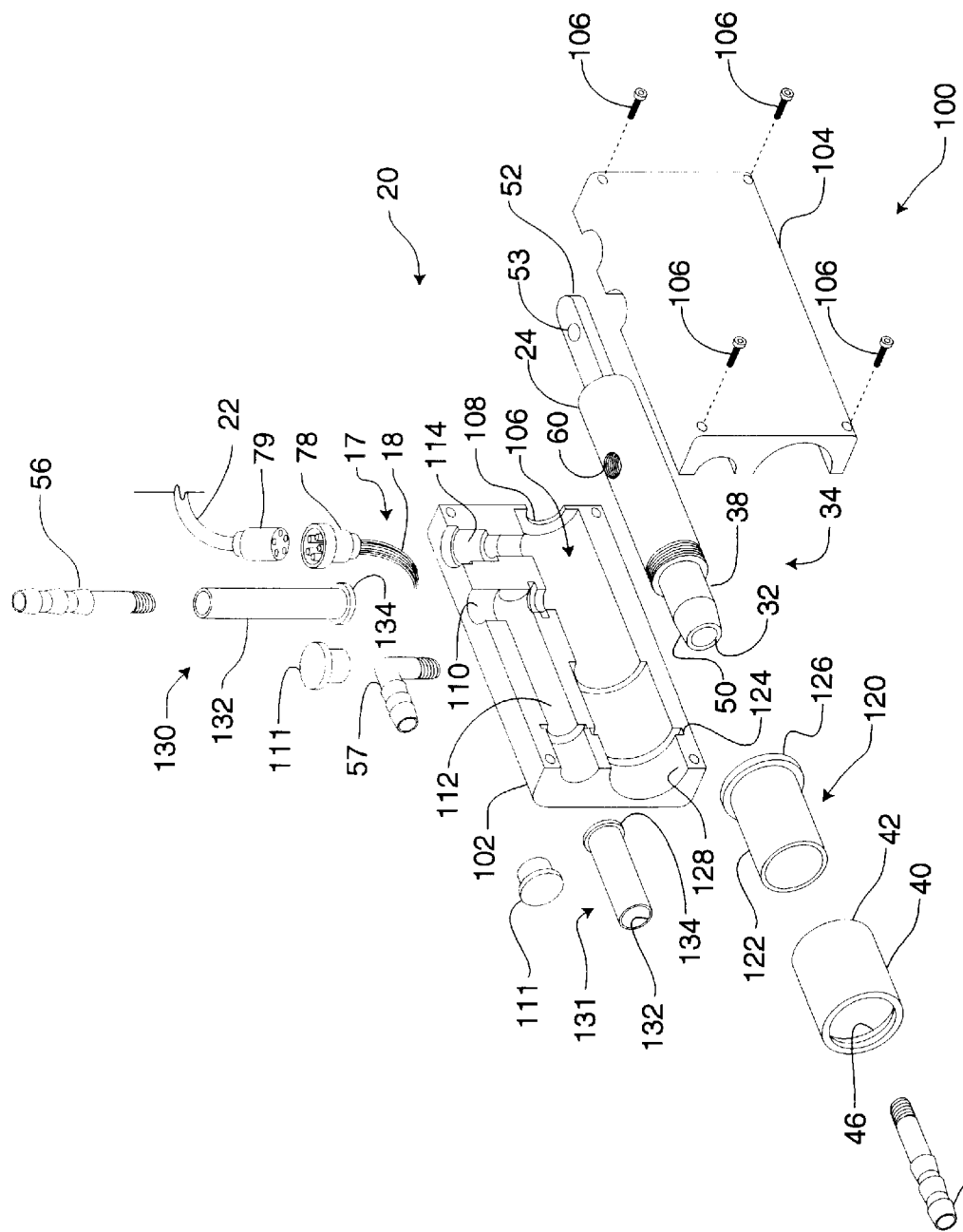
FIG. 6 is an exploded perspective view of the welding lead connector of the present invention.
Figure 7:
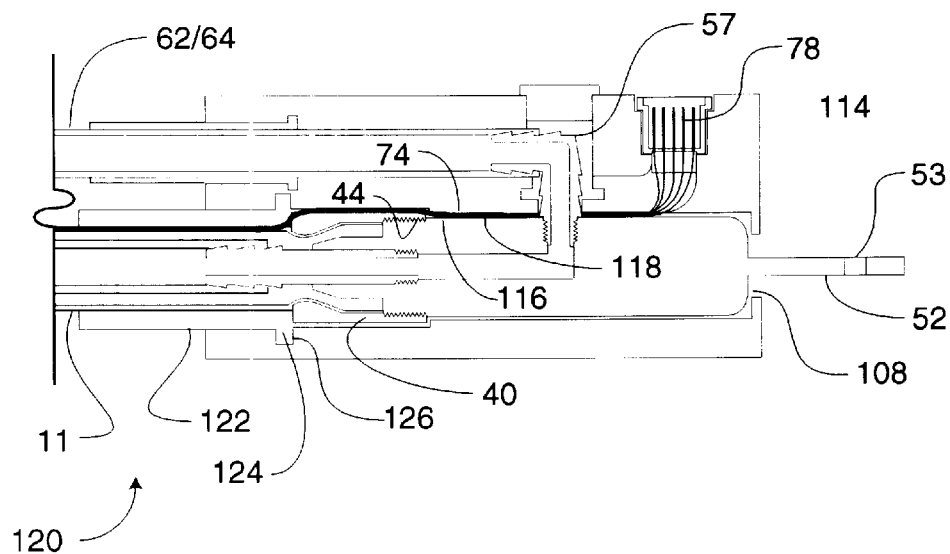
FIG. 7 is a detailed partial cross-sectional side view of an alternate embodiment of the welding lead connector of the present invention.
Figure 8:
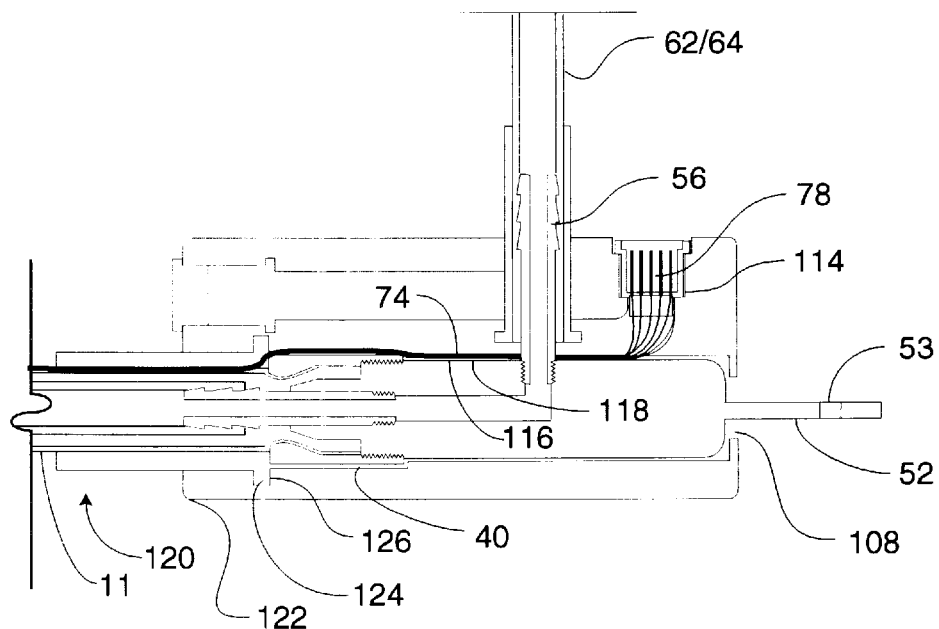
FIG. 8 is a detailed partial cross-sectional side view of an alternate embodiment of the welding lead connector of the present invention.

Each welding lead connector 20 is electrically insulated by either an outer flexible insulating covering (FIG. 4) or an outer rigid insulating covering (FIGS. 6 through 8). As shown in FIG. 4, the connector member or handle 24 may be disposed within flexible outer insulating covering 80. Separate flexible insulating boots 82 and 84 are installed over the fitting or connector nipple 56 and the sleeve 40 respectively. Finally, a flexible insulating reinforcement collar 86 is installed around the unitary welding lead 11 adjacent the electrode feed control leads 22 extending through the outer elastomeric covering 16. The flexible insulating reinforcement collar 86 may include a flexible sheath 88 surrounding the base of portion 89 of the electrode feed control leads 22 to reinforce the electrode feed control leads 22 adjacent the welding lead 11.

As best shown in FIG. 5, the flexible insulating reinforcement collar 86 may be held in place by an extended end portion 90 held in place between the inner surface 48 of the compression sleeve 40 and the inclined surface 50 of the conical end 34 of handle 24. A ridge 92 may be formed on the extended end portion 90 of the insulating reinforcement collar 86. The ridge 92 is received by a race 94 formed on the inner surface 48 of the compression sleeve 40 to strengthen the connection between the flexible insulation reinforcing collar 86 and the compression sleeve 40.

As shown in FIGS. 6 through 8, each welding connector 20 may be disposed within an outer rigid insulating housing generally indicated as 100. As best shown in FIG. 6, the outer rigid insulating housing 100 comprises a first housing member 102 and a second housing member 104 attached to each other by a plurality of fasteners such as bolts each indicated as 106 with the welding lead connector 20 secured therebetween. As best understood with references to FIGS. 6 and 7, the connector member or handle 24 of each welding lead connector 20 is received by a gallery or first recess 107 formed within the outer rigid insulating housing 100. The unitary fitting 28 is disposed within the gallery or first recess 107; while, the electrically conductive integral plug or member 52 extends outwardly from the outer rigid insulating housing 100 through an opening 108 formed in the end wall thereof. A first inert gas gallery or recess 110 and a second inert gas gallery or recess 112 are formed in the interior of the outer rigid insulating housing 100 to receive the fitting or connector nipple 56 or the 90° elbow 57. A cap 111 is used to close the inert gas gallery or recess 110 or 112 not utilized in a particular configuration.

As further shown in FIGS. 6 through 8, a socket or recess 114 is formed in the outer rigid insulating housing 100 to receive the unitary electrical plug or socket 78 electrically coupled to the insulated electrode feed control elements or conductors 18. The unitary electrical plug or socket 78 is connected to the unitary electrical plug 79 to electrically connect each insulated electrode feed control element or conductor 18 to the corresponding electrode feed control lead 22. The electrode feed control leads 22 at the opposite ends of the insulated electrode feed control element or conductor 18 are similarly coupled thereto by an unitary electrical plug 79 and unitary electric plug or socket 78 operatively connected to the electrode feed unit control bus of the particular welder machine in use.

As further shown in FIG. 6 a reinforcing collar generally indicated as 120 is formed on the unitary welding lead 11. The reinforcing collar 120 comprises an elastomeric tube 124 to receive the unitary welding lead 11. A flange 126 is formed on one end portion of the elastomeric tube 124 and is received by a race 128 formed in the inner surface 130 of the gallery or first recess 107 in order to retain the reinforcing collar 120 in place. Similarly, a reinforcing collar 131 is formed on the inert gas supply/intake tubing 62/64 comprising a sleeve 132 with a flange 134 in substantially the same configuration as the reinforcing collar 120. As with the reinforcing collar 120 for the unitary welding lead 11, the flange 134 of the reinforcing collar 134 for the inert gas supply/intake tubing 62/64 is received by a race 136 formed on the inner surface 138 of the outer rigid insulating housing 100.

To assemble, the inert gas supply conduit 62 is connected to the supply container 68 and the inert gas intake conduit 64 is connected to the electrode feed unit 6 such that inert gas is fed from the supply container 68 through the flexible inert gas conduit 12 of the unitary welding lead 2 to the welding gun lead 70 and ultimately to a welding gun 72; while, the power supply 8 and electrode feed unit 6 are mechanically and electrically coupled together by the unitary welding lead 2 and the insulated electrode feed control elements or conductors 18.

Operation of the MIG welding system 4 is essentially the same as other state of the art systems. In particular, once assembled, the MIG welding system is controled by the welding gun 72. Signals to control the supply of inert gas from the cylinder 68 through the flexible inert gas conduit 12 to the welding gun 72 and to control the supply of electric power from the power source 8 through the intermediate flexible electrical conductor 14 the electrode feed unit 6 are fed through the insulated electrode feed control element(s) or conductor(s) 18 to control operation of the MIG welding system.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A welding lead assembly for use with a metal inert gas welding system to operatively couple a welding gun through an electrode feed unit of the metal inert gas welder to a power supply and an inert gas supply, said welding lead assembly includes a welding lead having an inner flexible inert gas conduit coaxially disposed within a flexible electrical conductor and a plurality of electrode feed control elements to selectively supply inert gas and electrical power to the electrode feed unit through said inner flexible inert gas conduit and said flexible electrical conductor respectively and control signals between the welding gun and the power supply and inert gas supply through said electrode feed control elements to control operation of the metal inert gas welding system, said inner flexible inert gas conduit being in heat transfer relationship within said flexible electrical conductor to cool said flexible electrical conductor during operation of said welding lead assembly.

2. The welding lead assembly of claim 1 wherein said flexible electrical conductor is constructed of copper mesh sheathed in an outer elastomeric covering.

3. The welding lead assembly of claim 2 wherein said electrode feed control elements are disposed between said flexible electrical conductor and said outer elastomeric covering.

4. The welding lead assembly of claim 2 wherein said electrode feed control elements are disposed with said flexible electrical conductor.

5. The welding lead assembly of claim 1 wherein said welding lead terminates at each end with a welding lead connector and a plurality of electrode feed control leads.

6. The welding lead assembly of claim 5 wherein each said welding lead connector comprises a connector member including an insulated electrically conductive member with an insulated electrically conductive chassis having a fitting formed on one end thereof including a fitting received by an inert gas channel formed in the interior of said insulated electrically conductive chassis and a fitting operatively coupled to said inner flexible inert gas conduit and said flexible electrical conductor on the opposite end thereof.

7. The welding lead assembly of claim 6 wherein said flexible electrical conductor and said elastomeric covering extend beyond the end portion of said inner flexible inert gas conduit to receive a portion of said connector member which is received by a compression sleeve.

8. The welding lead assembly of claim 6 wherein each said welding lead connector further includes an electrically conductive integral plug formed in the end portion of said connector member to be coupled to the electrode feed unit and the power supply.

9. The welding lead assembly of claim 8 further includes a gas fitting means including a fitting coupled to said connector member received by a port formed through the side wall of said connector member in fluid communication with said inert gas channel, said gas fitting means operatively coupled to an inert gas supply conduit at one end of said welding lead assembly adjacent to the power supply and by an inert gas intake conduit at the end of said welding lead assembly adjacent the electrode feed unit.

10. A welding lead assembly for use with a metal inert gas welding system to operatively couple a welding gun through an electrode feed unit of the metal inert gas welder to a power supply and an inert gas supply, said welding lead assembly includes a welding lead having an inner flexible inert gas conduit coaxially disposed within a flexible electrical conductor and a plurality of electrode feed control elements to selectively supply inert gas and electrical power to the electrode feed unit through said inner flexible inert gas conduit and said flexible electrical conductor respectively and control signals between the welding gun and the power supply and inert gas supply through said electrode feed control elements to control operation of the metal inert gas welding system, said welding lead terminates at each end with a welding lead connector and a plurality of electrode feed control leads, each said welding lead connector comprises a connector member including an insulated electrically conductive member with an insulated electrically conductive chassis having a fitting formed on one end thereof including a fitting received by an inert gas channel formed in the interior of said insulated electrically conductive chassis and a fitting operatively coupled to said inner flexible inert gas conduit and said flexible electrical conductor on the opposite end thereof, said inner flexible inert gas conduit being in heat transfer relationship within said flexible electrical conductor to cool said flexible electrical conductor during operation of said welding lead assembly.

11. The welding lead assembly of claim 10 wherein said flexible electrical conductor and said elastomeric covering extend beyond the end portion of said inner flexible inert gas conduit to receive a portion of said connector member which is received by a compression sleeve.

12. The welding lead assembly of claim 11 wherein each said welding lead connector further includes an electrically conductive integral plug formed in the end portion of said connector member to be coupled to the electrode feed unit and the power supply.

13. The welding lead assembly of claim 12 further includes a gas fitting means including a fitting coupled to said connector member received by a port formed through the side wall of said connector member in fluid communication with said inert gas channel, said gas fitting means operatively coupled to an inert gas supply conduit at one end of said welding lead assembly adjacent to the power supply and by an inert gas intake conduit at the end of said welding lead assembly adjacent the electrode feed unit.

14. The welding lead assembly of claim 13 wherein said flexible electrical conductor is constructed of copper mesh sheathed in an outer elastomeric covering.

15. The welding lead assembly of claim 13 wherein said electrode feed control elements are disposed between said flexible electrical conductor and said outer elastomeric covering.

16. A welding lead assembly for use with a metal inert gas welding system to operatively couple a welding gun through an electrode feed unit of the metal inert gas welder to a power supply and an inert gas supply, said welding lead assembly includes a welding lead having an inner flexible inert gas conduit coaxially disposed within a flexible electrical conductor and a plurality of electrode feed control elements to selectively supply inert gas and electrical power to the electrode feed unit through said inner flexible inert gas conduit and said flexible electrical conductor respectively and control signals between the welding gun and the power supply and inert gas supply through said electrode feed control elements to control operation of the metal inert gas welding system, said electrode feed control elements are disposed with said flexible electrical conductor, said welding lead terminates at each end with a welding lead connector and a plurality of electrode feed control leads, said welding lead connector comprises a connector member including an insulated electrically conductive member with an insulated electrically conductive chassis having a fitting formed on one end thereof including a fitting received by an inert gas channel formed in the interior of said insulated electrically conductive chassis and a fitting operatively coupled to said inner flexible inert gas conduit and said flexible electrical conductor on the opposite end thereof, said flexible electrical conductor and said elastomeric covering extend beyond the end portion of said inner flexible inert gas conduit to receive a portion of said connector member which is received by a compression sleeve, each said welding lead connector further includes an electrically conductive integral plug formed in the end portion of said connector member to be coupled to the electrode feed unit and the power supply, further includes a gas fitting means including a fitting coupled to said connector member received by a port formed through the side wall of said connector member in fluid communication with said inert gas channel, said gas fitting means operatively coupled to an inert gas supply conduit at one end of said welding lead assembly adjacent to the power supply and by an inert gas intake conduit at the end of said welding lead assembly adjacent the electrode feed unit, said inner flexible inert gas conduit being in heat transfer relationship within said flexible electrical conductor to cool said flexible electrical conductor during operation of said welding lead assembly.

17. The welding lead assembly of claim 16 wherein said flexible electrical conductor is constructed of copper mesh sheathed in an outer elastomeric covering.

18. The welding lead assembly of claim 16 wherein said electrode feed control elements are disposed between said flexible electrical conductor and said outer elastomeric covering.

* * * * *